United States Patent [19]
Cousins et al.

[11] 3,810,388

[45] May 14, 1974

[54] FLOWMETERS

[75] Inventors: Terence Cousins, Luton, England; Klaus Joachim Zanker, Kiriat, Israel

[73] Assignee: George Kent Limited, Luton, England

[22] Filed: Mar. 22, 1973

[21] Appl. No.: 343,913

[30] Foreign Application Priority Data
Mar. 22, 1972  Great Britain .................... 13384/72

[52] U.S. Cl. ............................. 73/194 B, 73/194 C
[51] Int. Cl. ......................... G01f 1/00, G01p 5/00
[58] Field of Search ....................... 73/194 B, 194 C

[56] References Cited
UNITED STATES PATENTS
3,572,117  3/1971  Rodely ............................. 73/194 B

*Primary Examiner*—James J. Gill
*Attorney, Agent, or Firm*—Browdy and Neimark

[57] ABSTRACT

A flowmeter in which an elongated body extends across a conduit and causes vortices to be formed in a fluid flowing along the conduit. The frequency at which vortices are formed is proportional to the rate of flow of the fluid and sensing means are provided for generating a signal proportional to that frequency. The width of the body in a direction perpendicular to the direction of the flow is so arranged that the constant of proportionality between the frequency of vortex formation and the flowrate is at a minimum value.

13 Claims, 5 Drawing Figures

FLOWMETERS

This invention relates to flowmeters.

According to the invention there is provided a flowmeter comprising a conduit along which a flow of fluid can be established, an elongated body which extends across the conduit and is adapted to cause vortices to be formed in the fluid at a frequency proportional to the rate of flow of fluid, the constant of proportionality between the said frequency and the rate of flow first decreasing to a minimum value and then increasing as the ratio between the width of the body in a direction perpendicular to the fluid flow and the internal width of the conduit in that direction is increased and the ratio being so arranged that the constant of proportionality is equal or substantially equal to the said minimum value, and sensing means responsive to the formation of the vortices and adapted to generate a signal representative of the said frequency.

Over a wide range of flow rates flowmeters according to the invention generate vortices at a frequency which is proportional to the volume flow rate which it is desired to measure.

The elongated body in a meter according to the invention can be any body which is capable of shedding vortices in a flowing fluid in which the body is immersed. The body may have any "bluff," i.e. non-streamlined, cross-section and need not necessarily have a flat or generally flat face presented to the fluid flow. Thus, the bluff body can have the form of a cylinder of circular cross-section, the axis of the body extending along a diameter of the conduit, or it may have a square or rectangular cross-section. Suitably, the body is constituted by a plate with its major surfaces normal to the axis of the conduit.

Although the conduit of the flowmeter is preferably circular in cross-section, conduits of square, rectangular or other cross-section can be used.

The invention will now be described, by way of example, with reference to the accompanying drawings, in which.

Figure 1:
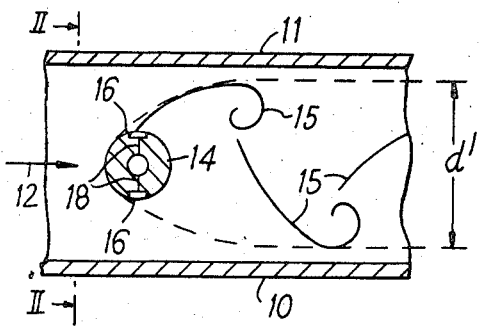
FIG. 1 is an axial section of a flowmeter according to the invention.
Figure 2:
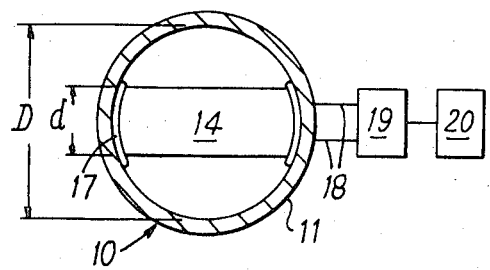
FIG. 2 is a section on the line II—II of FIG. 1.

Referring to FIGS. 1 and 2, one flowmeter 10 according to the invention includes a conduit 11 of circular cross-section. In use, a flow of a fluid whose rate of flow is to be measured is established along the conduit 11 in the direction of the arrow 12 in FIG. 1.

Extending across the conduit 11 is an elongated bluff body 14 in the form of a cylinder of circular cross-section. The body 14 extends along a diameter of the conduit 11 and in FIGS. 1 and 2 is shown in a horizontal position. It will be understood, however, that the body 14 may be in practice have any angular orientation around the axis of the conduit 11. Seals 17 are provided between the ends of the body 14 and the wall of conduit 11 to prevent fluid flow between these ends and the wall.

The conduit 11 is of uniform cross-section for sufficient length upstream of the body 14 for the flow impinging on the cylinder to be non-swirling. Downstream from the body 14 vortices are generated, as hereinafter described.

The body 14 carries sensing means including a pair of temperature sensitive or heat loss detectors 16 which are received in recesses at diametrically opposed positions on the periphery of the body, midway between the ends thereof and in a plane which extends at right angles to the conduit axis. Detectors 16 generate electrical signals of frequency equal to the frequency at which vortices are shed from the body 14.

Leads 18 extend from the detectors 16 via passages in the body 14 and the side wall of the conduit 11 and connect the detectors to a circuit 19 which generates a pulsed output signal of frequency corresponding to the frequency of the signal from detectors 16. The output signal from circuit 19 is supplied to an indicating and/or control circuit 20 in the form of a pulse counter. The circuits 19 and 20 can be conventional.

As indicated in FIG. 1, the body 14 causes vortices 15 to be formed in the flow of fluid downstream of the body, the vortices being shed alternately from each side of the body.

For a bluff body extending across a flow of fluid along a conduit sufficiently wide for the side walls of the conduit to have no effect on the vortices generated by the body the two rows of vortices form a wake having a width $d'$ downstream of the body, as shown in FIG. 1. As the width of the conduit is decreased the magnitude of $d'$ is changed, but this change is not significant for the widths of conduit employed in meters according to the present invention.

It is found that the ratio $d':d$, where $d$ is the effective width of the body at right angles to the direction of fluid flow, is a constant for a given shape of body but varies with different shapes. For a body in the form of a cylinder of circular cross-section the constant $K$, referred to as the bluffness of the body, is equal to 1.1.

The frequency f at which the vortices 15 are shed by the bluff body 14 in the present meter is proportional to the volume flow rate Q of fluid along the conduit 11.

Figure 5:
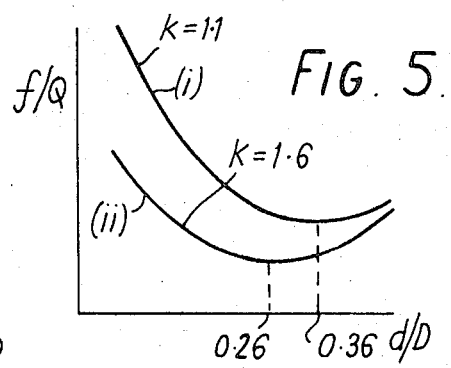
FIG. 5 is a graph showing how the ratio of the vortex shedding frequency and the volume flow rate through the flowmeters of FIGS. 1 and 2 and FIG. 4 varies with the ratio of the width of the bluff body and the diameter of the conduit in each flowmeter.

We have investigated the effect of varying the effective width $d$ of a body relative to the internal width $D$ of a conduit, taken in the same direction as $d$. FIG. 5 of the drawings shows the manner in which the ratio of $f:Q$ varies with the ratio $d:D$.

In FIG. 5, curve (i) applies to the body 14 of FIGS. 1 and 2, i.e., a cylinder of circular cross-section ($K=1.1$) It will be noted that as the ratio $d:D$ increases the ratio $f:Q$ first decreases, reaches a minimum value when $d:D$ is equal to 0.36 and subsequently increases.

Figure 3:
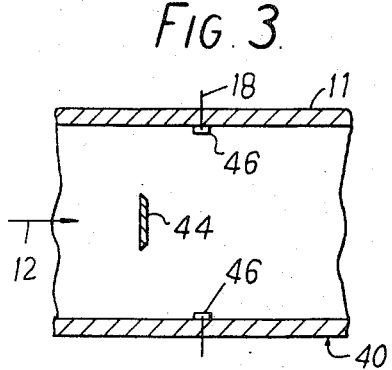
FIGS. 3 and 4 are axial sections of respective second and third flowmeters according to the invention.

In the region of the minimum in curve (i) of FIG. 3 the curve is flat, a 10 percent change in $d:D$ causing only a 1 percent increase in the ratio $f:Q$. In the embodiment of FIGS. 1 and 2 the body 14 has therefore a diameter $d$ which is equal to, or substantially equal to, 0.36 times the internal diameter D of the conduit 11. This provides the following advantages. First, since a small change in the ratio $d:D$ has little effect on the ratio $f:Q$ manufacturing tolerances on the dimensions $d$ and $D$ need not be as strict as would otherwise be necessary. Secondly, calibration of the meter is hardly affected by changes in dimensions of the bluff body due to the corrosive action of fluids. Thirdly, changes in either sense in the ratio $d:D$ cause an increase in the ratio $f:Q$. Finally, it is found that the meter is less sensitive to disturbances in the flow upstream of the body.

FIG. 3 of the drawings is an axial section of a second flowmeter according to the invention. Flowmeter 40 includes a bluff body 44 in the form of a plate which extends across a conduit 11 of circular cross-section. The body 44 has its two opposed faces of largest area normal to the direction of fluid flow, indicated by arrow 12 in FIG. 3. Heat loss detectors 46 are mounted on the side wall of the conduit 11, downstream of the body 44, and generate electrical signals of frequency equal to the frequency at which vortices are shed by the body 44.

For a bluff body in the form of a flat plate the bluffness K is equal to 1.6. Curve (ii) shows how the ratio $f:Q$ varies with the ratio $d:D$ for such a plate, $d$ being the effective width of the plate at right angles to the direction of fluid flow and D the internal width of the conduit 11 in the same direction. It will be noted that curve (ii) has a minimum when $d:D$ equals 0.26. The body 44 has therefore a width d which is equal to, or substantially equal to, 0.26 times the diameter D of the conduit 11.

It is found that the curve (ii) is flatter in the region of its minimum than was the curve (i). For a change in $d:D$ of 10 percent there is only a 0.5 percent increase in $f:Q$.

Figure 4:
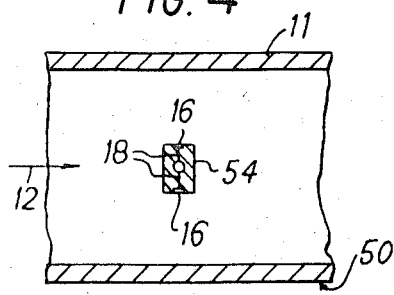

FIG. 4 of the drawings is a third flowmeter 50 according to the invention and has a bluff body 54 of rectangular cross-section disposed in a conduit 11. The body 54 is arranged with its wider pair of opposite surfaces extending normal to the direction of fluid flow. These surfaces have a width which is 3/2 times the width of the other pair of opposite surfaces, this being the condition at which there is maximum energy available for vortex information  The body 54 has a bluffness K equal to 1.7. It is found that the minimum value of the curve for the ratio $f:Q$ occurs when the ratio $d:D$ equals 0.25.

In general, it is found that the larger the value of K, i.e., the more bluff the body, the flatter is the curve of the ratio f:Q plotted against the ratio $d:D$ in the region of its minimum. This is borne out by curves (i) and (ii) of FIG. 5, where a flatter curve is obtained for $K = 1.6$ than for $K = 1.1$. It is confirmed by similar curves, not shown, for the rectangular body 54 of FIG. 4 and for a body of square cross-section, which has $K = 1.5$ and has a curve almost as flat as curve (ii). It will be appreciated that the flatter the curve the more pronounced are the advantages discussed above in connection with the meter of FIGS. 1 and 2.

The form of curves (i) and (ii) of FIG. 5 can be confirmed theoretically in the following manner.

For a flow of fluid past a bluff body in a conduit the Strouhal Number, S, is defined as $S = fd/v'$, where f is the frequency at which vortices are generated, $d$ is the effective width of the body and $v'$ is the velocity of fluid flow downstream of the body. It can be shown that $$v' = v/(1 - (4K/\pi)(d/D))$$

for a conduit of circular section and diameter D and for a flow of velocity $v$ upstream of the body. Accordingly, $$S = fd/v [1 - (4K/\pi)(d/D)]$$

The volume flow rate Q is given by $Q = V\pi D^2/4$  2
Thus, $$f/Q = 4S/\pi D^3 [1/d/D (1 - 4K/\pi \, d/D)]$$

From this relationship the value of the ratio $d:D$ to give a minimum value of $d:D$ can be computed.

In each of the flow meters described above the conduit has a circular cross-section and the elongated body extends from one side of the conduit to the other. On occasions, however, it may be necessary to employ a conduit of non-circular cross-section, say rectangular section. If the body then extends from side to side of the conduit, parallel with the longer side of the conduit cross-section, and the width of the body is that which is required to provide a minimum value of $f:Q$, the ratio of the length of the body to its width is greater than the "correlation" length, i.e., the length at which the frequency and phase at which vortices are shed is constant along the length of the body. To avoid this the body is reduced in length to a length equal or substantially equal to the correlation length and end plates are provided on the body to prevent flow of fluid along the body.

The above-described meters have sensing means which provide electrical signals of frequency proportional to the frequency at which vortices are shed. It will be appreciated that other forms of electrical sensing means generating electrical signals whose phase or amplitude is representative of the frequency of vortex shedding may also be employed. The sensing means may take the form of those disclosed in co-pending U.S. application Ser. No. 262,173 filed June 15, 1972, where the sensing means make direct or indirect use of movements of the whole or parts of the bluff body to produce an electrical output, for example by straining a piezo-electric crystal or varying a capacitance. Alternatively, detecting means which do not provide an electrical signal can be used, for example a fluidic element.

We claim:

1. A flowmeter comprising a conduit which a flow of fluid can be established, an elongated body which extends across the conduit and is adapted to cause vortices to be formed in the fluid at a frequency proportional to the rate of flow of fluid, the constant of proportionality between the said frequency and the rate of flow first decreasing to a minimum value and then increasing as the ratio between the width of the body in a direction perpendicular to the fluid flow and the internal width of the conduit in that direction is increased and the ratio being so arranged that the constant of proportionality is equal or substantially equal to the said minimum value, and sensing means responsive to the formation of the vortices and adapted to generate a signal representative of the said frequency.

2. A flowmeter as claimed in claim 1, wherein the said ratio is between 90 percent and 110 percent of the value at which the constant of proportionality is equal to the said minimum value.

3. A flowmeter as claimed in claim 1 wherein the said body is a flat plate and the said ratio of the width of the plate to the internal width of the conduit is equal or substantially equal to 0.26.

4. A flowmeter as claimed in claim 1 wherein the said body is a cylinder of circular cross-section and the ratio of the diameter of the cylinder to the internal width of the conduit is equal or substantially equal to 0.36.

5. A flowmeter as claimed in claim 1 wherein the said body has a rectangular cross-section, and the said ratio of the width of the body to the internal width of the conduit is equal or substantially equal to 0.25.

6. A flowmeter as claimed in claim 5 wherein the said width of the body is greater than the thickness thereof in a direction parallel with the direction of fluid flow.

7. A flowmeter as claimed in claim 6 wherein the ratio of the width of the body to the thickness thereof is equal to or substantially equal to 3:2.

8. A flowmeter as claimed in claim 1 wherein the said body has a square cross-section.

9. A flowmeter as claimed in claim 1 wherein the conduit has a circular internal cross-section.

10. A flowmeter as claimed in claim 1 wherein the body extends across the conduit from one side thereof to the opposed side and sealing means are provided between each of the opposed sides and the adjacent part of the body.

11. A flowmeter as claimed in claim 1 wherein opposed ends of the body are spaced from respective opposed sides of the conduit and each end of the body is provided with an end plate which serves to prevent, or substantially to prevent, fluid flow in a direction lengthwise of the body.

12. A flowmeter as claimed in claim 1 wherein the sensing means are adapted to provide an electrical signal representative of the said frequency.

13. A flowmeter as claimed in claim 12 wherein the said electrical signal is an alternating signal having a frequency representative of the said frequency.

* * * * *